United States Patent [19]

Jung

[11] 4,349,279

[45] Sep. 14, 1982

[54] METHOD FOR THE COLOR EVALUATION OF PATTERN MODELS OF FABRIC, DECORATION OR PACKAGING PRINTING, AND A COLOR EVALUATION DEVICE

[75] Inventor: Eggert Jung, Schoenberg, Fed. Rep. of Germany

[73] Assignee: Dr. Ing. Rudolf Hell GmbH, Fed. Rep. of Germany

[21] Appl. No.: 101,696

[22] Filed: Dec. 10, 1979

[30] Foreign Application Priority Data

Dec. 12, 1978 [DE] Fed. Rep. of Germany ....... 2853509

[51] Int. Cl.$^3$ .............................................. G01J 3/50
[52] U.S. Cl. .................................... 356/402; 250/226; 358/80; 364/526; 356/405; 356/406
[58] Field of Search ............... 356/402, 406, 407, 405; 250/226; 364/526; 340/146.3 B; 358/75, 80

[56] References Cited

U.S. PATENT DOCUMENTS 3,942,154 3/1976 Akami et al. ................. 340/146.3 B

FOREIGN PATENT DOCUMENTS

52-18137 2/1977 Japan ............................ 340/146.3 B
52-71286 6/1977 Japan .................................. 356/406

*Primary Examiner*—F. L. Evans
*Attorney, Agent, or Firm*—Hill, Van Santen, Steadman, Chiara & Simpson

[57] ABSTRACT

A method for the color evaluation of pattern models of fabric, decoration or packaging printing which, in particular, exhibit bleeding color areas, i.e. color areas of differing color saturation and/or brightness, and a color evaluation device with a color monitor is provided for carrying out the method. Color recognition signals characteristic for the individual pattern colors and a run signal, dependent on the respective color saturation, are derived from the color measured value signals obtained through opto-electric scanning of the pattern models. A freely-selectable color signal triad corresponding to the color to be displayed on the color monitor is assigned in a coloration unit to each pattern color and a further color signal triad is prescribed for the background color of the later printing medium. For displaying the pattern models on the color monitor, the color recognition signals in the coloration unit call in the color signal triads. The control signals for the color monitor are determined from the color signal triads called in, from the color signal triad of the background color and from the run signal.

22 Claims, 7 Drawing Figures

METHOD FOR THE COLOR EVALUATION OF PATTERN MODELS OF FABRIC, DECORATION OR PACKAGING PRINTING, AND A COLOR EVALUATION DEVICE

BACKGROUND OF THE INVENTION

1. Field of the Invention

The present invention relates to a method for the color evaluation of pattern models of textile, decoration or packaging printing, in which a pattern model having a plurality of pattern colors is scanned line-by-line in order to obtain primary color measuring signals and is displayed on a color monitor, controlled by video color signals prior to printing the pattern on a printing medium and to a color evaluation device.

2. Description of the Prior Art

Whereas the application of color on a printing medium in multi-color printing occurs by means of the overprinting of different components of the separation colors magenta, cyan and yellow, every color to be printed in fabric, decoration or packaging printing is mixed before the printing process and then separately transferred to the printing medium. The pattern models for the mentioned printing types, for example, exhibit color areas of different coloration residing separately next to one another, whereby the individual color areas have differing color saturation and/or brightness (gradation color areas). In this case, analogue graduated color separations must be produced for the individual pattern colors with the assistance of a color scanner, which half tone color separations supply both a statement concerning a local distribution of the colors in the pattern modules, i.e. essentially over the geometric pattern, as well as a statement concerning the amount of color.

In such a color scanner, three primary color measuring signals are obtained by means of point-by-point and line-by-line optoelectronic pattern scanning, which primary color measuring signals represent the color components red, green and blue of the scanned image points. A color recognition circuit has the primary color measuring signals applied thereto and selects the individual pattern colors and generates specific color separation signals for the pattern colors perceived, which specific color separation signals modulate the brightness of lamps as recording elements. The lamps expose a recording medium, in the form of films, point-by-point and line-by-line, and the films, after development, represent the desired screened or un-screened color separations for the production of the printing forms.

For the printing process, printing colors changed with respect to pattern colors can be assigned to the color separations. Often, the same fabric design is to be printed with different color combinations (color variations), whereby only some of the pattern colors are respectively changed while others are retained.

To this end, it is desirable to examine the printing result with respect to design, coloration and color composition before printing, in order to be able, if necessary, to correct colors and to judge different color locations without having to first produce a printing proof for the purpose of monitoring.

Color display devices for true-color simulation of printing processes are already known in the art and provide a visual evaluation of the final product. In such a color display device, a pattern is scanned in terms of video by means of a color camera and is again recorded on a color monitor. The color signals arising upon scanning are converted in a color computer into corrected color separation signals. A printing simulation computer connected to the output of the color computer, which specifically considers the printing parameters for the multi-color printing, converts the corrected color separation signals into control signals for the color monitor in such a manner that the display of the pattern on the picture screen of the color monitor produces the same colored impression as the multi-color printing. These known color display devices are specifically designed for multi-color printing, but are not designed for the concerns of fabric, decoration and packing printing. Although a color correction must be carried out with the color display devices, this is only effective for wide coverage. Targeted color changes of a single color area can only be imperfectly executed since the selectivity of the known color computers does not cover the desired, narrower correction areas which differ from pattern-to-pattern. Moreover, there is no possibility to simultaneously evaluate different color variations.

SUMMARY OF THE INVENTION

The primary object of the present invention, therefore, is to eliminate the above disadvantages and provide a method for color evaluation specifically adapted to the problems of fabric, decoration or packing printing and to provide an appropriate color evaluation device for pattern models which, in particular, exhibit graduating color areas.

According to the invention, a method for the color evaluation of pattern models of fabric, decoration or packaging printing in which a pattern model is scanned point-by-point and line-by-line for obtaining color measurement value signals and is again recorded on a color monitor, provides that a run signal is generated from each pattern color dependent on the color saturation of the respective pattern colors, that a first color value triad representing the background color of the printing medium to be used is set, that a freely selectable second color value triad corresponding to the color to be displayed on the color monitor is assigned to each pattern color and that, in the re-recording, the color signal triads for driving the color monitor are determined for each pattern color from the respective run signal, the first color value triad and the second color value triode.

A color evaluation device for implementing the above method has a signal source for generating color measured value signals representative for a pattern model and a color monitor for the line-by-line recording of the pattern model. More specifically, a first circuit is connected to the signal source for the color recognition of the pattern colors and is operable to produce respective color output signals. A second circuit is connected to the signal source for the generating the run signal for each pattern color dependent on the color saturation of the respective pattern colors from at least one primary color measuring signal. A coloration unit is connected to the first and second circuits and to the color monitor and is freely selectable to selectively assign video color signals to the pattern colors for controlling the color monitor.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

In order to implement the method of the present invention, a color evaluation device for pattern models of fabric, decoration, packaging printing and the like is provided for simulating the desired coloration of an individual color and various color combinations (color variations) of the design to be printed. The color evaluation device further corrects and examines the colors for their visual effect without the need to produce proof of printings.

The color evaluation device is particularly conceived for pattern models which exhibit a plurality of color areas of differing coloration residing next to one another, whereby the individual color areas have varying color saturation and/or brightness (graduation color areas). Of course, pattern models whose color areas exhibit constant color saturation and brightness (full tone color areas) can also be displayed.

Figure 1:
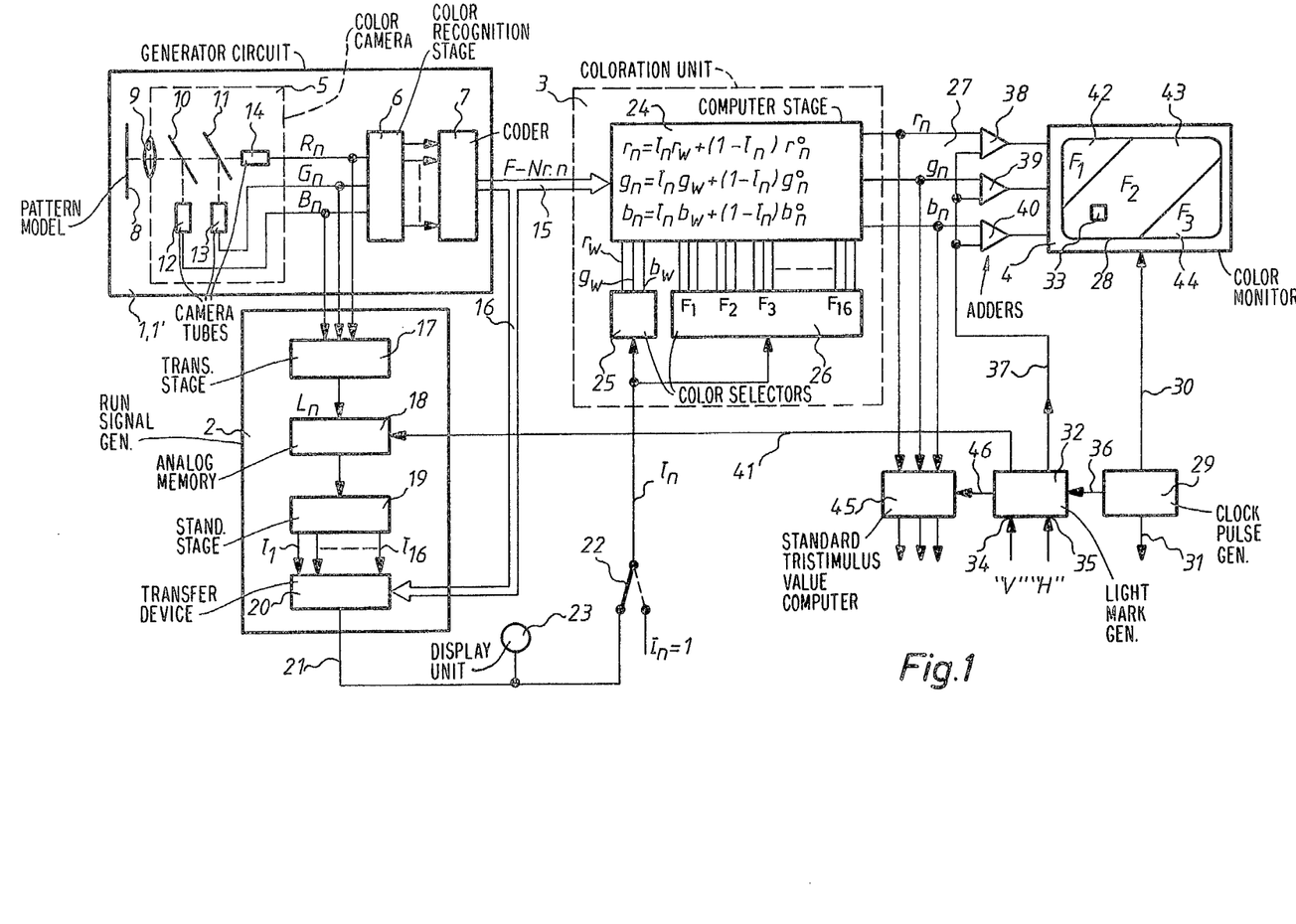
FIG. 1 is a schematic diagram of an exemplary embodiment of a color evaluation device constructed in accordance with the present invention.

The color evaluation device of FIG. 1 essentially comprises a generator circuit 1, a run signal generator 2, a coloration unit 3 and a color monitor 4 for displaying the pattern models.

The generator circuit 1, which generates the primary color measuring signals $R_n, G_n$ and $B_n$ (red, green and blue) representative of the individual pattern colors, comprises an electronic color scanner in the form of a color camera 5 as the signal source, a color recognition stage 6 and a coder 7.

The color camera 5 scans a colored pattern model 8 (design) in terms of video point-by-point and line-by-line. The scanning light is split into three partial beams by means of a lens 9 and two semi-silvered mirrors 10 and 11. The partial beams strike camera tubes 12, 13 and 14 of varying spectral sensitivity which opto-electronically convert the light received into the three primary color measuring signals $R_n, G_n$ and $B_n$.

For separating the pattern colors, the color recognition stage 6 is connected to the output of the color camera 5 and is operable to generate color output signals which are characteristic of the individual pattern colors.

The color recognition stage 6 is constructed, for example, according to the German Pat. No. 2,544,703, corresponding to U.S. Pat. No. 4,110,826. In this case, the color recognition spaces in which the color space is divided are simulated by means of electronic threshold circuits for the primary color measuring signals.

The color recognition stage 6 can, however, be designed as in the German Pat. No. 2,628,053, corresponding to U.S. Pat. No. 4,194,839, whereby a threshold value stage is post-connected. The color recognition spaces are then respectively determined by the position of a barycentric color and by means of the shape, expanse and orientation in the color space.

The color recognition stage 6 distinguishes in which color recognition spaces the primary color measuring signals continuously obtained in the pattern scanning fall and then emits the corresponding color output signals.

The color recognition stage 6 for example, may be designed for the discrimination of 16 pattern colors. It then generates 16 color output signals which are then converted in the coder 7 into digital 4-bit color numbers n, where n=1 . . . 16 and which are output onto data lines 15 and 16. The coder 7, for example, is a decimal-to-binary coded decimal (BCD) priority encoder of the type Ser. No. 74147 of the Texas Instruments Company.

The output of the camera 5 is also connected to the run signal generator 2 which comprises a transformation state 17, an analog memory 18, a standardization stage 19 and a transfer device 20.

Figure 4:
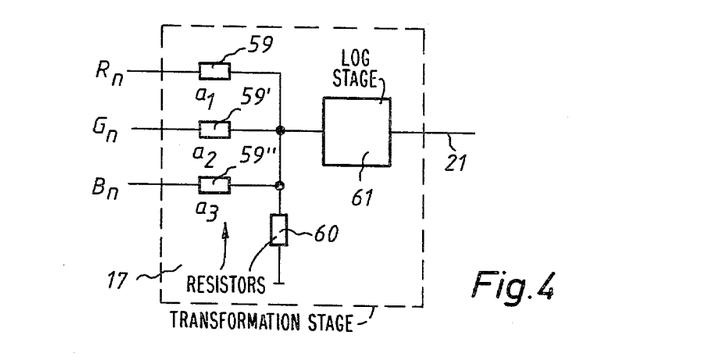
FIG. 4 is a schematic diagram of an exemplary embodiment of a transformation stage.

Whereas the color numbers supply a statement concerning the hue of the graduation color areas in the pattern model, the run signal is a measure for the color saturation or, respectively, brightness, i.e. for the run in these color areas. Given full tone color areas, the run signal is constant. In an advantageous manner, the run signal can be a primary color measuring signal or a signal derived from at least one primary color measuring signal. In the exemplary embodiment of FIG. 1, the run signal $L_n$ is derived from all three primary color measured signals $R_n, G_n$ and $B_n$ according to the equation $$L_n = a_1 R_n = a_2 G_n + a_3 B_n$$

and it is therefore identical to the brightness signal. The run signal $L_n$ is generated in the transformation stage 17 which is illustrated in greater detail in FIG. 4. The run signal can, if necessary, be logarithmicized or partially logarithmicized in the transformation stage 17.

Figure 5:
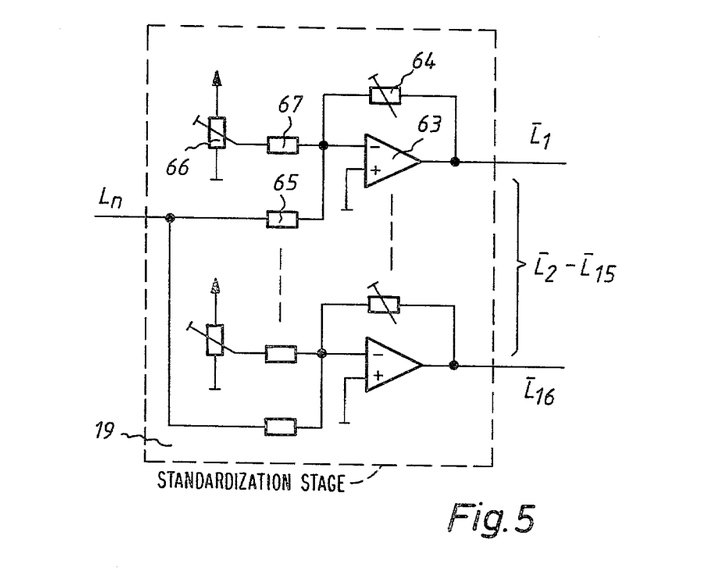
FIG. 5 is a schematic diagram of an exemplary embodiment of a standardization stage.

In the stardardization stage 19, which is illustrated in greater detail in FIG. 5, a standardized run signal $\overline{L_n}$ is set for each pattern color or, respectively, color number, to which end the run signal $L_n$ is briefly retained in the analog memory 18, which is designed as a sample-and-hold circuit.

The standardized run signals $\overline{L_1} \ldots \overline{L_{16}}$ charge the transfer device 20, which is constructed as an integrated 16 channel analog multiplexer of the type 506 of the Siliconix Company, for example. Controlled by the digital color numbers n on the data line 16, the transfer device 20 respectively connects the standardized run signal $\overline{L_n}$ assigned to the color number n concerned through and relays the same by way of the line 21 and a further transfer device 22 to the coloration unit 3. A display unit 23 is preferably provided for measuring the standardized run signals $\overline{L_n}$. The standardization will be explained in greater detail below.

Figure 6:
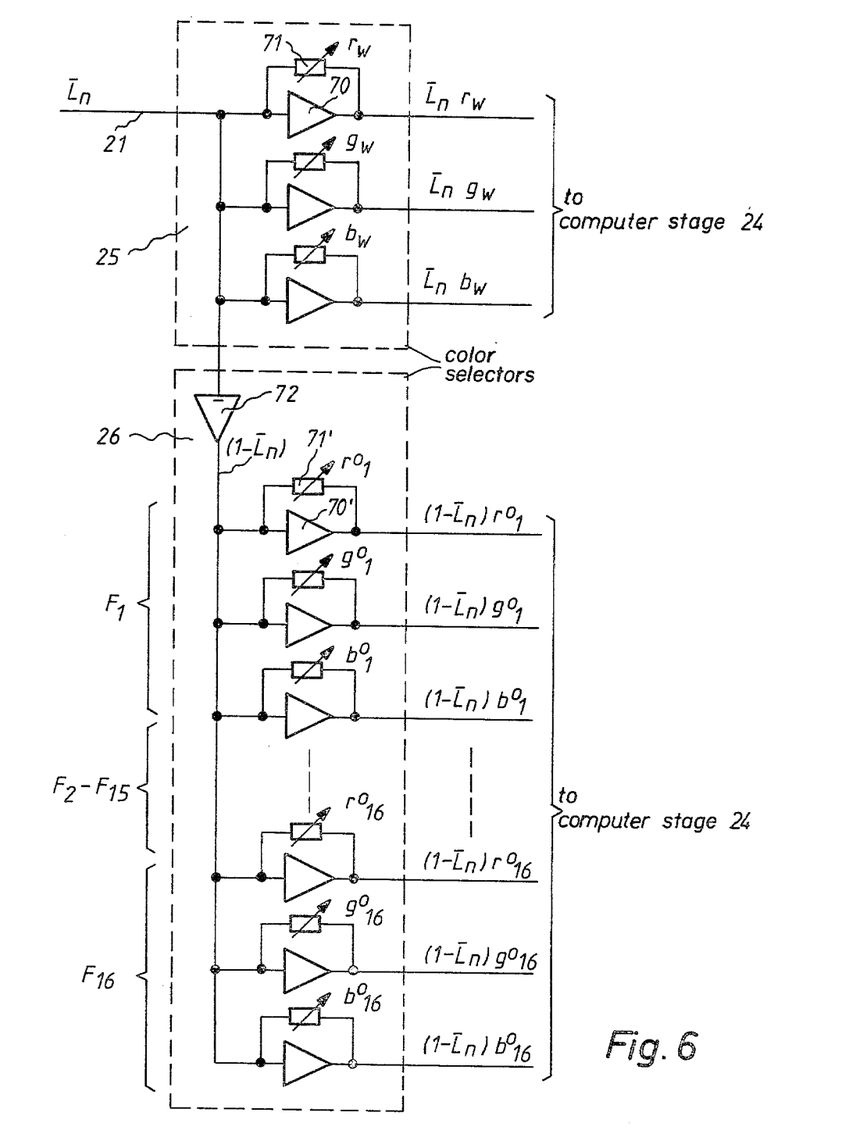
FIG. 6 is a schematic representation of an exemplary embodiment for the color selectors of the coloration unit.

In addition to a computer stage 24, the coloration unit 3 comprises a first color selector 25 and a second color selector 26 which are described in greater detail in FIG. 6.

Figure 7:
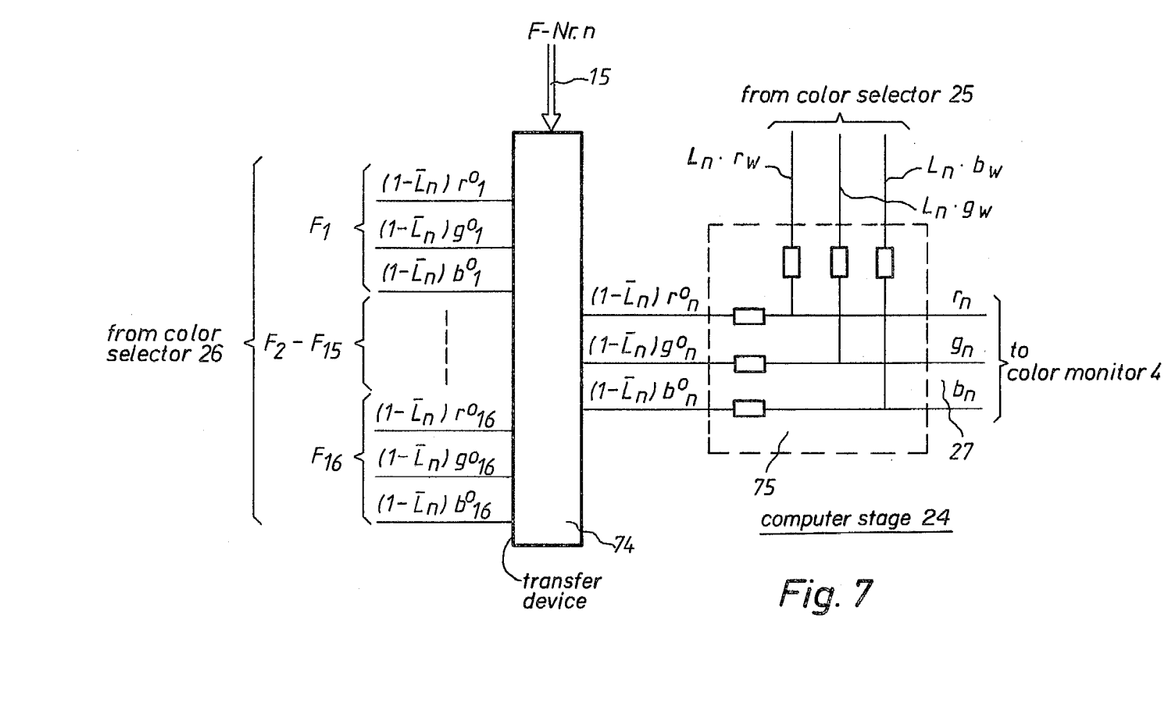
FIG. 7 is a schematic representation of an exemplary embodiment of a computer stage of the coloration unit.

The computer stage 24, which is described in greater detail in FIG. 7, assigns a freely-selectable color $F_n$ to be displayed on the color monitor 4 or, respectively, its video color signal triad ($r_n$, $g_n$, $b_n$) to each color number n incoming via the data line 15 for the control of the color monitor by way of lines 27. The computer stage 24, instead of being controlled by the color numbers, can also be controlled by the color output signals of the color recognition stage 6.

The assignment occurs according to the following equations $$r_n = \overline{L_n} \cdot r_w + (1 - \overline{L_n}) \cdot r_n^o$$

$$g_n = \overline{L_n} \cdot g_w + (1 - \overline{L_n}) \cdot g_n^o$$

$$b_n = \overline{L_n} \cdot b_w + (1 - \overline{L}) \cdot b_n^o$$

For example, the following assignment occurs: n=1 corresponds to $F_1 = (r_1, g_1, b_1)$ and n=2 corresponds to $F_2 = (r_2, g_2, b_2)$, etc.

As can be seen from the above equations, the video color signal triads ($r_n$, $g_n$, $b_n$) depend on the standardized run signal $\overline{L_n}$ on the line 21, on a freely-selectable first color value triad ($r_w$, $g_w$, $b_w$) and on a, likewise freely-selectable second color value triad ($r_n^o$, $g_n^o$, $b_n^o$). The first color value triad, which takes the white or colored background of the printing medium into consideration is set once for each printing medium at the first color selector 25. The second color selector 26 serves for setting the color value triads for the individual colors $F_n$ to be displayed.

A color displayed on the color monitor can be set of like color with the assistance of a coloration unit with respect to the pattern color identified by means of the same color number, that can also be set so as to be completely different. The sequence of color numbers obtained in the line-by-line pattern scanning does not, therefore, categorize the pattern colors per se but, rather, the arrangement of the individual color areas in the pattern model, i.e. essentially the geometric pattern, since pattern areas of like color are identified by means of the same color number.

The display of the pattern model 8 on the picture screen 28 of the color monitor 4 occurs according to line-jump scanning with 50 half images per second in order to obtain a non-flickering image. Scanning and displaying are controlled by a clock pulse generator 29 which, following the technology standard in television, generates horizontal and vertical deflection signals, line start pulses and image start pulses on a multiple line 30, as well as a control pulse on a further line 31 for the synchronization of the signal source 1. Such color pulse generators are known in the art, so that a more detailed description is superfluous.

For marking a measuring area on the picture screen 28, a light mark generator 32 is provided which mixes a displaceable light mark 33 into the picture screen 28. The displacement of the light mark 33 is controlled by means of two signals (H;V) at the inputs 34 and 35 of the light mark generator 32, which signals, for example, are generated by means of a coordinate control lever. Of course, a cursor can also be employed.

The light mark generator 32 is synchronized on a line 36 by the image start pulses and line start pulses generated in the clock pulse generator 29. In the time intervals in which the recording electron beams pass over the selected measuring area, the light mark generator 32 generates a constant signal value on a line 37. This signal value is superposed on the color signals by means of a plurality of adders 38, 39 and 40 so that the three electron beam generating systems of the color monitor 4 are simultaneously switched on with the same luminence, whereby the "white" light mark 33 arises.

The light mark generator 32, synchronous with the signal value on the line 37, supplies a record pulse which is supplied to the analog memory 18 in the run signal generator 2 by way of a line 41. Since the dot mark generation and the record pulse are synchronized, the run signal $L_n$ respectively assigned to the measuring area on the screen 28 is inscribed once per half image in the analog memory 18 and retained for standardization.

The manner of operation of the color evaluation device is as follows:

Assume a pattern model 8 is displayed on the picture screen 28 of the color monitor 4, which pattern model 8, for reasons of clarity, comprises only three graduation color areas 42, 43 and 44 residing next to one another with the colors $F_1$, $F_2$ and $F_3$, i.e. exhibits color areas with varying color saturation per se. The second color value triads ($r^o_1$, $g^o_1$, $b^o_1$); ($r^o_2$, $g^o_2$, $b^o_2$) and ($r^o_3$, $g^o_3$, $b^o_3$) set at the color selector 26, as well as the assigned color numbers n=1 ... n=3 belong of these colors $F_n$.

In a first operating step, the standardization of the run signals $L_1$, $L_2$ and $L_3$ of the individual graduation color areas 42, 43 and 44 occurs.

As already explained above, the run signal $L_n$ of a graduation color area is a measure for its color saturation distribution. For example, the run single $L_n$ within a red color area in a bright red image location (minimum color saturation) has a large value and has a small value in a dark red image location (maximum color saturation).

For setting the standardized run signal $L_n$, the operator successively marks the brightest and the darkest image location in each graduation color area on the picture screen 28 of the color monitor by means of the light marked 33 or of a cursor, whereby the appertaining upper and lower run values $L_n$ are briefly retained in the analog memory 18 of the run signal generator 2. With the assistance of the standardization stage 19 in the run signal generator 2, the operator's task then resides in the respective setting of the run value $L'_n$ for minimum color saturation to the standardized value $\overline{L'_n} = 1$ and the corresponding run value $L''_n$ for maximum color saturation to the standardized run value $\overline{L''_n} = 0$ for the colors $F_n$ displayed on the color monitor 4, whereby $\overline{L'_n}$ and $\overline{L''_n}$ represent the corner values of the standardized run signal $L_n'$ and the signal shape is fixed between these corner values by means of the color saturation distribution within the color areas. Preferably, the signal shape of the run signal can be changed by means of a gradation stage.

In a second operating step, the first color value triad $r_w$, $g_w$ and $b_w$ for the desired background color of the printing medium are set once under visual control on the color monitor 4 in the first color selector 25 of the coloration unit 3 by means of potentiometers.

For this operation, the transfer device 22 is placed in the position illustrated with broken lines. In this case, the first color selector 25 is charged with the standardized run signal $L_n' = 1$, so that the equations set forth above are simplified as follows:

$$r_n = r_w$$

$g_n = g_w$
$b_n = b_w$.

In this case the video color signals $r_n$, $g_n$ and $b_n$ for controlling the first color monitor 4 on the lines 27 are identical to the color triad ($r_w$, $g_w$, $b_w$) set at the first color selector 25 and the background color of the printing medium appears on the color monitor 4, which background color can be judged, compared with an extant pattern if necessary, and corrected. If the desired background first color is white, the color value triad ($r_w$, $g_w$, $b_w$) set correspond to the three values of the individual phosphors "red", "green" and "blue" of the picture screen 28 for displaying the color "white".

In a third operational step in which the transfer device 22 is again in the illustrated position, the operator, by setting the second color value triads ($r^o_n$, $g^o_n$, $b^o_n$) at the second color selector 26 in the coloration unit 3, can adapt the colors $F_n$ displayed on the color monitor 4 to the pattern colors by means of visual comparison or, on the other hand, can alter individual colors, replace individual colors, or set completely different color variations.

The color evaluation device now offers the operator the possibility of simulating the expected final product on the color monitor 4 without having to make proofs. In an advantageous manner, he can evaluate and change the geometric shape of the design, the coloration of the individual colors and the color composition of the design until the optimum shape has been found.

Preferably, a white frame whose type of light is identical to the observation light of the final product (for example, 5000 K or D 6500) is faded into the picture screen 28 of the color monitor 4, whereby color evaluation errors because of color change are avoided.

If the colors $F_n$ are found for an optimum coloration of the design, the first color value triad ($r_w$, $g_w$, $b_w$) and the second color value triads ($r^o_n$, $g^o_n$, $b^o_n$) set for the background color and the individual colors $F_n$ are measured at the color selectors 25 and 26 and retained. The values determined in this manner can again be input into the color selectors 25 and 26 at a later time in order to again be able to display, evaluate and correct the design.

Preferably, the color evaluation device is supplemented by means of a circuit for the determination of the standard tristimulus of the colors $F_n$ displayed on the color monitor 4. The standard tristimulus values form the initial values for a color mixing computer which determines the primary color components of the printing inks to be mixed for the above types of printing. Such a color mixing computer is known, for example, from the periodical "Die Farbe", Vol. 14, 1965, Pages 80–90, Musterschmidt-Verlag, Goettingen. The circuit for determining the standard tristimulus values, is described in detail in the German patent application No. P 28 39 187.9, and essentially comprises a standard tristimulus value computer 45 which is driven by the light mark generator 32.

The measurement area within the corner color $F^o_n$ of a color surface is determined with the assistance of the movable dot mark 33, the CIE standard tristimulus values $F_n$, $Y_n$ and $Z_n$ of this color area being the ones to be determined. By means of a command from the dot marked generator 32 on a line 46, the second color value triads ($r^o_n$, $g^o_n$, $b^o_n$) belonging to the marked measuring area are filtered out and stored from the video color signals continuously generated by the coloration unit 3 on the lines 27 in the CIE coordinate computer 45, whereby the first color value triad of the background color is suppressed. The second color value triads ($r^o_n$, $g^o_n$, $b^o_n$) selected in this manner are then transformed into the desired standardized tristimulus values ($X_n$, $Y_n$, $Z_n$) in the standardized tristimulus values computer 45 upon consideration of the non-linear curves of the color picture tubes.

Instead of the generator 1, a different generator circuit 1' can also be connected to the data lines 15 and 16. This generator circuit 1', for example, consists of an image memory as a signal source in which the digitized primary color measurement signals are deposited, of the color recognition stage 6 and the coder 7. The color numbers and the run signal can also already be deposited in the image memory.

To this end, a pattern model was already scanned with a color scanning device in the form of a color scanner or a primary color camera before the displayed and the color measurement signals thereby obtained were digitized and, if necessary, coded into the color numbers and then stored.

An image refresh memory is then connected to the output of the image memory, into which image refresh memory the image data are transferred and from which, for generating the still picture on the color monitor 4, the same are cyclically read 50 times per second per half image and delivered onto the data lines 15 and 16.

A plurality of coloration units 3 can also be assigned to the color monitor 4, at which coloration units different color variations and background colors can be set. For the purpose of evaluation, the appropriate coloration units 3 are successively connected to the color monitor 4.

Figure 2:
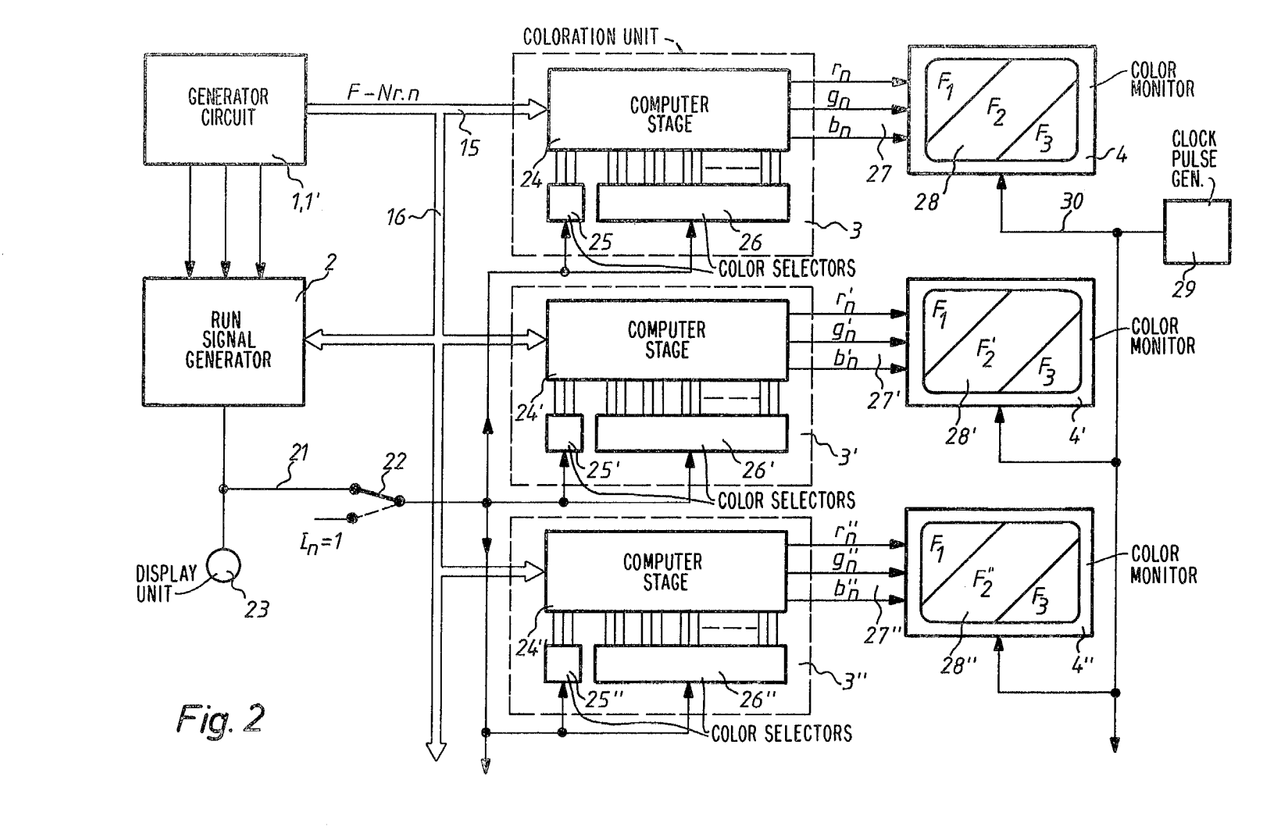
FIG. 2 is a schematic illustration of an advantageous further development of the color evaluation device and having a plurality of color monitors.

FIG. 2 illustrates an advantageous further development of the color evaluation device. For the purpose of simultaneous simulation of different color variations and background colors of a textile design, for example, the color evaluation device preferably comprises additional color monitors, two-further monitors 4' and 4" in the exemplary embodiment, as well as appertaining coloration units 3' and 3". The color monitors 4' and 4" are likewise driven by the clock pulse generator 29.

In this embodiment of a color evaluation device constructed in accordance with the present invention, the operator will set one primary color variation with the colors $F_1$, $F_2$ and $F_3$ on the picture screen 28 of the color monitor 4 and will set different color variations with the same or a different background color on the picture screens 28' and 28" of the additional color monitors 4' and 4". For example, the color $S_2$ is changed to $F'_2$ on the picture screen 28' and the color $F_2$ is changed to $F''_2$ on the picture screen 28", whereby the colors $F_1$ and $F_3$ remain unchanged. The run in the altered colors can be retained, or can likewise be varied.

The employment of a plurality of color monitors renders possible the immediate, visual comparison of the different color variations and background colors of the design. Likewise, a standard tristimulus value computer 45 can be allocated to each color monitor (not shown). The plurality of color monitors can be expanded as desired.

The color evaluation device according to FIG. 2 can be advantageously altered in the following manner. The coloration unit 3, as previously, is connected to the color monitor 4 via the lines 27 and is additionally connected by way of a first adding stage to the color monitor 40' and by way of a second adding stage to the color monitor 4". The coloration units 3' and 3" are likewise connected to the adders. Only correction video color signal values are now set at the color generators 3' and 3'' and delivered to the corresponding adders.

The operator again sets the primary color variation on the picture screen 28 of the color monitor 4 with the assistance of the coloration unit 3. If the correction video color signal values of the coloration units 3' and 3'' are first equal to zero, the primary color variation also appears on the picture screens 28' and 28''. Then, by means of the coloration units 3' and 3'', the correction video color signal values are set which are required for the display of the different color variations on the picture screens 28' and 28''.

The embodiment has the advantage that those colors which remain unchanged in the color variations need be set only once.

Figure 3:
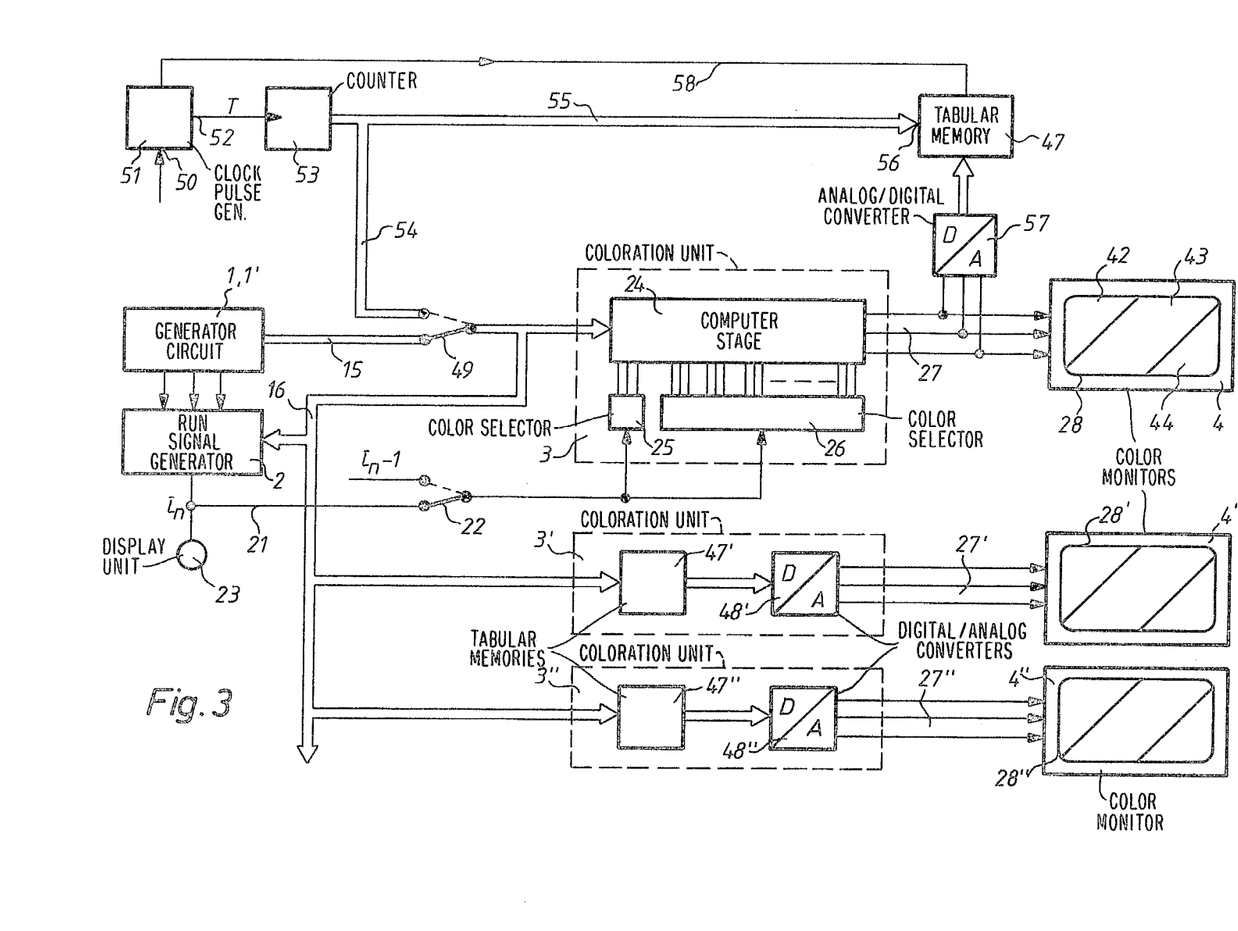
FIG. 3 is a schematic diagram of a variation of the color evaluation device of the present invention.

FIG. 3 illustrates a further advantageous embodiment of the color evaluation device according to FIG. 2, comprising the generator circuit 1 or 1', the run signal generator 2, the coloration units 3, 3' and 3'', as well as the color monitors 4, 4' and 4''. The coloration unit 3 again comprises a computer stage 24, a first color selector 25 and a second color selector 26. In deviation from FIG. 2, the coloration units 3' and 3'', on the other hand, respectively comprise a tabular memory 47' and 47'' with digital/analog converters 48' and 48'' connected to the outputs thereof.

The manner of operation of the embodiment of FIG. 3 is as follows.

First, as already described, the operator will undertake the standardization of the run signals and the setting of the background color of the printing medium.

Then, with the assistance of the second color selector 26 and the coloration unit 3, the operator will first set a desired primary color variation of the pattern model with the colors $F_1$, $F_2$ and $F_3$ on the picture screen 28 of the color monitor 4. For this operation, a transfer device 49 is situated in the position illustrated on the drawing, so that the color numbers arriving by way of the data line 15 from the generator circuit 1 or 1' control the computer stage 24 in the coloration unit 3 and control the transfer device 20 in the run signal generator 2 by way of the data line 16. The coloration unit 3 then supplies the video color signals ($r_n$, $g_n$, $b_n$) for the color monitor 4 controlling assigned to the output color numbers.

After setting the primary color variation, the operator actuates the transfer device 49, which is now situated in the position illustrated with broken lines, and activates a clock pulse generator 51 by way of an input 50. The clock pulse generator 51 supplies a counting pulse T by way of a line 52 to a clock pulse input of a 4-bit binary counter 53 which calls in the color numbers n=1 ... 16 once. The color numbers n called in are transmitted by way of a data line 54 and by way of the transfer device 49 to the run signal generator 2 and the coloration unit 3 and, simultaneously, by way of a further data line 55 to an address input 56 of a tabular memory 47. An analog/digital converter 57 digitalizes the video color signals ($r_n$,$g_n$,$b_n$) on the lines 27 generated by means of the coloration unit 3 into, for example, respective 8-bit memory words which are recorded, in parallel, into the tabular memory 47 on a line 58 with a write pulse generated by the clock pulse generator 51. By means of the synchronous control of the run signal generator 2, of the coloration unit 3 and of the tabular memory 47, the filling of the memory occurs in such a manner that the video color signals ($r_n$, $g_n$, $b_n$) assigned by means of the coloration unit 3 are stored as 3×8-bit memory words under the respective addresses coinciding with the called-in color numbers n.

After the tabular memory 47 has been filled, the color information for the primary color variation of the pattern model are transferred into the tabular memory 47'' of the coloration unit 3'', so that the primary color variation is now displayed on the picture screen 28'' of the color monitor 4''.

Subsequently, the color information deposited in the tabular memory 47 for the first color variation are transferred into the tabular memory 47' of the coloration unit 3' and the first color variation is displayed on the picture screen 28' of the color monitor 4'. The operator can now simulate a second color variation on the picture screen 28 of the color monitor 4 and fill the tabular memory with the appertaining color information.

The advantage of the embodiment just described essentially is that the video color signals found for the individual color variation need not be measured and retained since they are already contained in the tabular memories. After termination of the color evaluation, the tabular memories can be employed for the color mixing calculation or, on the other hand, can be archivally stored. If a further display or correction is desired at any later time, the archivally stored tabular memories can be connected to the coloration unit of the color evaluation device in a simple manner without having to reset the video color signals required for the display.

FIG. 4 illustrates a circuit arrangement for the transformation stage 17 in the form of a resistor grid. The primary color measurement signals $R_n$, $G_n$ and $B_n$ are supplied to a plurality of resistors 59, 59' and 59'' which are grounded by way of a common resistor 60. The resistors 59, 59' and 59'' are weighted in accordance with the coefficients $a_1$, $a_2$ and $a_3$ for the primary color measuring signals in the transformation equation $$L_n = a_1 \cdot R_n + a_2 \cdot G_n + a_3 \cdot B_n.$$

The signal on the line 21 is the run signal $L_n$ which corresponds to the brightness signal in this case. A logarithmicization or partial logarithmicization can occur, if needed, in a post-connected stage 61.

FIG. 5 illustrates an exemplary embodiment for the standardization stage 19 which is constructed of 16 individual stages of which only two, for standardizing the run signals $L_1$ and $L_{16}$, are illustrated. Each individual stage comprises an operational amplifier 63 which is countercoupled by way of a potentiometer 64 and whose inverting input has the run signal $L_n$ applied thereto by way of a resistor 65. A negative countervoltage is generated at a potentiometer 66 and superposed on the run signal by way of a resistor 67.

With the minimum run signal $L''_1$ of the color $F_1$ applied, the countervoltage is set in such a manner that the resulting voltage at the inverting input and, therefore, the output voltage of the operational amplifier 63, is zero, which corresponds to the standardization of the minimum run signal to $\overline{L''}_1 = 0$. Subsequent thereto, the maximum run signal $L'_1$ is supplied to the inverting input of the operational amplifier 63 and the amplification due to the potentiometer 64 is changed in such a manner that the output signal is equal to "1", which corresponds to the standardization of the maximum run signal to $\overline{L'}_1 = 1$. The other run signals are treated in the same manner.

FIG. 6 illustrates an exemplary embodiment for the color selectors 25 and 26 of the coloration unit 3. The color selectors comprise a multitude of operational amplifiers which are countercoupled by means of potentiometers. Three operational amplifiers are present for each color or, respectively, for each color valve triad.

For setting the background color, the first color selector 25 comprises three operational amplifiers 70 which have the standardized run signal $\overline{L_n}$ applied thereto, the first color value triad $r_w$, $g_w$ and $b_w$ of the background color being set at the potentiometers 71 of the operational amplifiers 70. The output signals $\overline{L_n} \cdot r_w$, $\overline{L_n} \cdot g_w$ and $\overline{L_n} \cdot b_w$ arrive at the computer station 24 of the coloration unit 3.

For setting the 16 possible colors $F_n$, the second color selector 26 comprises 16×3 operational amplifiers 70' of which only the operational amplifiers for setting the colors $F_1$ and $F_{16}$ are illustrated in FIG. 6. The operational amplifiers 70' of the second color selector 26 have the run signal $(1 - \overline{L_n})$, inverted by an amplitude inverter 72, applied thereto. The second color value triads of the colors ($r^o_n$, $g^o_n$, $b^o_n$) to be displayed are preselected at the appertaining potentiometers 71'. The output signals $(1 - \overline{L_n})$ $(1 - \overline{L_n}) \cdot r^o_n$, $(1 - \overline{L_n}) \cdot G^o_n$ and $(1 - \overline{L_n}) \cdot B^o_n$ of the operational amplifier 70' likewise arrive at the computer stage 24 of the coloration unit 3. The coloration unit 3 could also be constructed of digital components or in a so-called hybrid technology, for example, as disclosed in the German Pat. No. 27 25 864.

FIG. 7 illustrates an exemplary embodiment of the computer stage 24 of the coloration unit 3.

The 16×3 output signals generated by the second color selector 26 arrive at a transfer device 74 which is controlled by the digital color numbers on the data line 15. The transfer device 74, for example, is constructed of integrated 16 channel analog multiplexers of the type 506 of the Siliconix Company. Each multiplexer, in turn, comprises a BCD decimal decoder and a multitude of integrated metal-oxide semiconductor (MOS) field effect transistors as switches. The transfer device 74 respectively connects the signal triad assigned to the momentarily pending color numbers to an adder stage 75 in which the components of the first color selector 25 are added thereto. The output signals $r_n$, $g_n$ and $b_n$ of the adder stage 75 are the video color signals for controlling the color monitor 4.

The invention is not limited to the evaluation of pattern models of fabric, decoration or packaging printing or the like, to the contrary, it can also be employed given all pattern models that are not intended for multicolor printing (mixed printing).

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for color evaluation of pattern models for fabric, decoration or packaging printing and the like, in which a pattern model having a plurality of pattern colors is scanned point-by-point and line-by-line for obtaining primary color measuring signals and is displayed on a color monitor controlled by video color signals prior to printing the pattern on a printing medium, comprising the steps of:

generating a run signal for each pattern color dependent on the color saturation of the respective pattern colors; setting a first color value triad representing the background color of the printing medium;

assigning a second color value triad to each pattern color, the second color value triads representing the colors to be displayed on the color monitor; and determining the video color signals for each color displayed on the color monitor from the corresponding run signals, the first color value triad and the second color value triads.

2. The method of claim 1, wherein:
said run signals are generated from at least one primary color measuring signal.

3. The method of claim 1, comprising the further steps of:

connecting the run signal $L_n$ of each pattern color (n) into a standardized run signal $\overline{L_n}$ by setting the value for the location of maximum color saturation at the standardized run signal value $\overline{L_n} = 0$ and the value for the location of minimum color saturation at the standardized run signal value $\overline{L_n} = 1$; and determining the video color signals ($r_n$, $g_n$, $b_n$) from the standardized run signal $\overline{L_n}$, the first color value triad ($r_w$, $g_w$, $b_w$) and from the second color value triad ($r^o_n$, $g^o_n$, $b^o_n$) in accordance with the relationships $$r_n = \overline{L_n} \cdot r_w + (1 - \overline{L_n}) r^o_n$$

$$g_n = \overline{L_n} \cdot g_w + (1 - \overline{L_n}) g^o_n$$

$$b_n = \overline{L_n} \cdot b_w + (1 - \overline{L_n}) b^o_n.$$

4. The method of claim 3, comprising the step of:
selecting the respective standardized run signal $\overline{L_n}$ for the continuous determination of the video color signals from the plurality of standardized run signals $\overline{L_n}$ of the individual pattern colors.

5. The method of claim 3, comprising the further step of:
setting the standardized run signal value at $L_n = 1$ for displaying the background color on the color monitor and for setting the respective first color triad.

6. The method of claim 4, comprising the further step of:
indicating the selected standardized run signal $L_n$.

7. The method of claim 1, comprising the further step of:
simultaneously displaying different color variations of the pattern colors on the color monitor.

8. The method of claim 1, comprising the further steps of:
selecting a measuring area within a color displayed on the color monitor;
determining the primary color measuring values of the selected measuring area; and
generating the corresponding run signal value $L_n$ from the primary color measuring values.

9. The method of claim 8, comprising the further step of:

generating a displaceable visible mark on the color monitor to designate the measuring area.

10. The method of claim 8, comprising the further steps of:
selecting the measuring area at the locations of the maximum and minimum color saturation within the pattern colors displayed on the color monitor;
determining the primary color measuring values of the selected measuring areas;
generating the corresponding run signal values $\overline{L_n}$ from the primary color measuring values; and
converting the run signal values $\overline{L_n}$ into standardized run signal values $\overline{L_n}$.

11. The method of claim 1, comprising the further step of:
fading in a monochromatic frame into the pattern model displayed on the color monitor for improving color evaluation, the type of light of the monochromatic frame coinciding with that of the light source used to observe the printing.

12. The method of claim 1, comprising the further step of:
generating the standard tristimulus values of the colors displayed on the color monitor from the video color signals.

13. A color evaluation device for evaluating color pattern models for fabric, decoration or packaging printing and the like, in which a signal source generates primary color measuring signals of a pattern model having a plurality of pattern colors and in which a color monitor operates line-by-line to display the pattern model prior to printing the pattern on a printing medium, comprising:
a first circuit connected to the signal source for recognizing the pattern colors and for generating respective color output signals;
a second circuit connected to said signal source for generating a run signal for each pattern color dependent on the color saturation of the respective pattern colors from at least one primary color measuring signal; and
a coloration unit having inputs connected to the first and second circuits and an output connected to the color monitor, said coloration unit being adjustable to selectively assign video color signals to the pattern colors for controlling the color monitor.

14. The color evaluation device of claim 13, wherein said signal source comprises:
an opto-electronic color scanner for scanning the pattern model.

15. The color evaluation device of claim 13, wherein said signal source comprises:
a digital memory for storing digital color value signals.

16. The color evaluation device of claim 13, wherein said first circuit comprises:
a color recognition stage for generating a representative color recognition signal for each pattern color, said color recognition signals representing the color output signals.

17. The color evaluation device of claim 16, wherein said first circuit further comprises:
a color stage connected to the output of said color recognition stage for encoding the color recognition signals into digital color numbers, the color numbers representing said color output signals.

18. The color evaluation device of claim 13, for the simultaneous displaying of different color variations of a pattern model, and further comprising: additional color monitors; and
additional coloration units each having inputs connected to said first and second circuits and outputs connected to respective ones of said additional color monitors.

19. The color evaluation device of claim 18, wherein some of said coloration units each comprise:
a tabular memory for receiving and storing the video color signals controlling the color monitor; and respective digital/analog converters connected to the outputs of said tabular memories, said tabular memories being addressable by the digital color output signals of said second circuit.

20. The evaluation device of claim 13, wherein said coloration unit comprises:
means for setting a first color value triad representing the background color of the printing medium;
means for assigning a second color value triad to each pattern color, the second color value triads representing the colors desired to be displayed on the color monitor; and
means for determining the video color signals, controlling said monitor, from the corresponding run signals, said first color value triad and from said second color value triads.

21. The evaluation device of claim 13, and further comprising:
circuits for determining the standardized tristimulus values of the colors displayed on the color monitor from the video color signals.

22. The evaluation device of claim 13, and further comprising light mark generators for generating displaceable light marks on the color monitor.

* * * * *